Nov. 27, 1956 K. R. WENDT 2,771,993
SEPARATING EQUIPMENT
Original Filed Oct. 19, 1948 2 Sheets-Sheet 1

INVENTOR
Karl R. Wendt
BY
Francis J. Darke
ATTORNEY

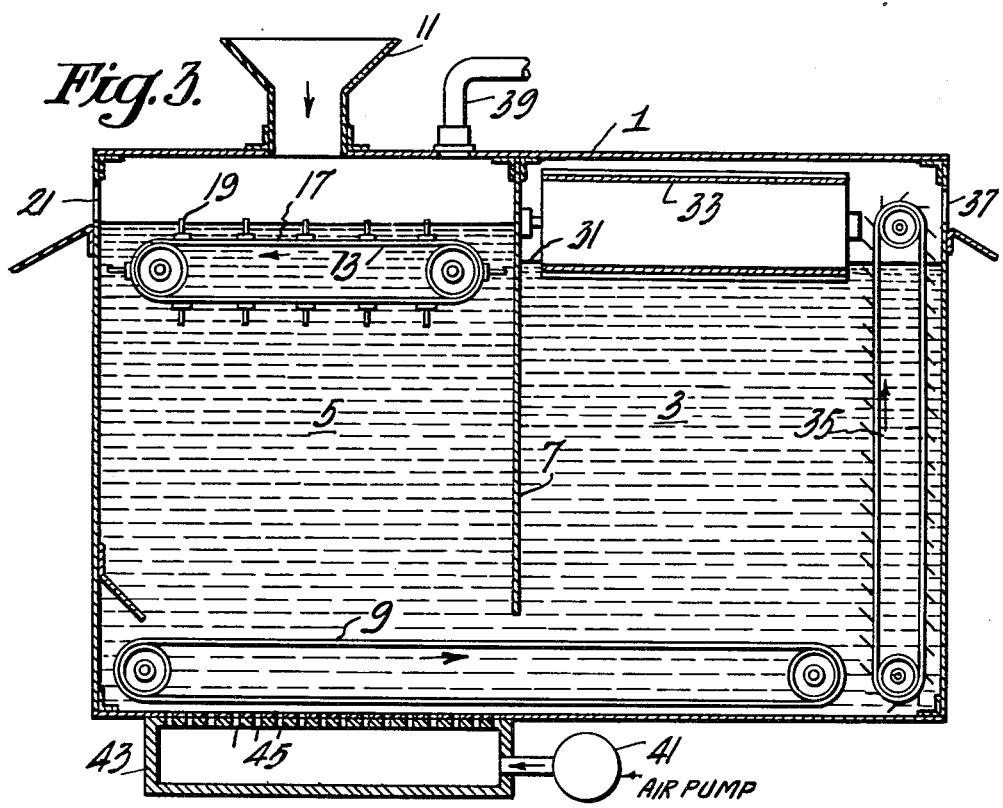
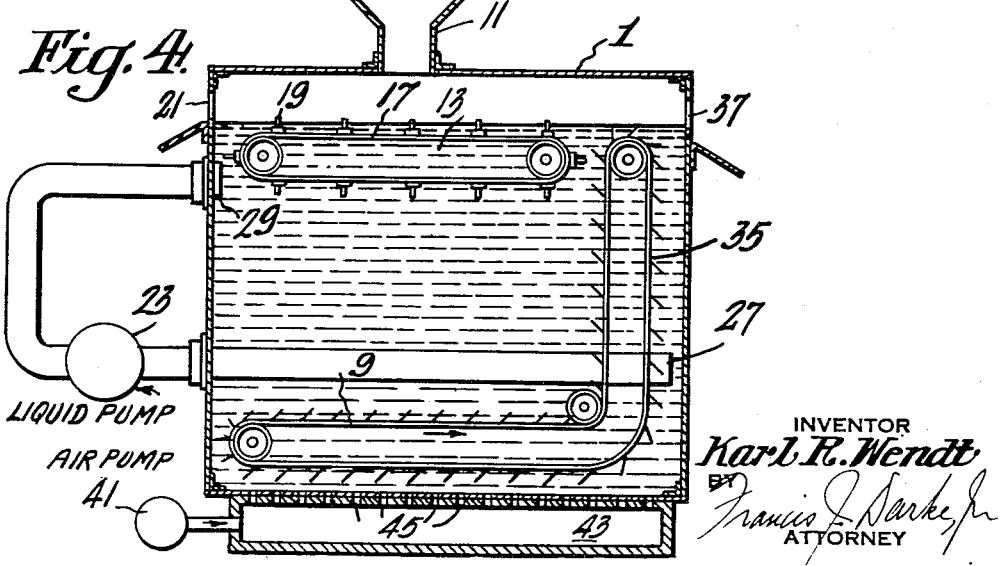

United States Patent Office 2,771,993
Patented Nov. 27, 1956

2,771,993

SEPARATING EQUIPMENT

Karl R. Wendt, Eggertsville, N. Y.

Original application October 19, 1948, Serial No. 55,319. Divided and this application August 28, 1952, Serial No. 306,843

5 Claims. (Cl. 209—172)

This invention relates to methods and means for material separation, and more particularly to separation of materials in accordance with their specific gravities. This application is a division of my Patent 2,620,069, dated December 2, 1952 and entitled Method of and Apparatus for Separating Materials of Different Specific Gravity.

This invention depends for its operation on the fundamental law that a body or material immersed in a liquid will float if its specific gravity is less than that of the liquid, and will sink if its specific gravity is greater than the liquid.

It is quite well known and established that the materials may be separated in accordance with their respective specific gravities by immersing them in a liquid, such as water, having a predetermined specific gravity. It is possible by this well known arrangement to separate materials above and below the specific gravity of the liquid. Many very suitable and convenient arrangements have been proposed for accomplishing this result.

According to this invention, a method and arrangement is provided wherein fundamentally the specific gravity of the liquid is changed while the material to be separated is immersed therein, thus providing for a separation procedure which permits separating that portion of the mixture of materials which has a predetermined specific gravity.

Although it is not intended that the practice of this invention should be limited thereto, as will become evident after the reading of the specification and an inspection of the accompanying drawing, an arrangement will be shown and described for the separation of potatoes from other foreign material normally gathered during harvest.

The separation of potatoes from a mixture of potatoes, grass tops, stones, etc., is selected by way of example in view of the fact that the specific gravity of a potato is only slightly greater than that of water.

Heretofore the operation of separating potatoes from foreign material has been performed by migrant manual labor and presents an economic and social problem. For instance, when a large crew is hired for digging potatoes, the farmer is necessarily forced to use the crew at the available time regardless of the existing market price, and harvest cannot then be regulated easily to suit market or weather conditions.

Furthermore, under the present system the potatoes must lie in the sun for some considerable time and may be sun scalded, which will make itself shown by a spoiled carload upon arrival of the potatoes at their destination.

By the practice of applicant's invention in one of its forms, a much smaller crew may perform the harvest and any possibility of sun scald may be prevented. The potatoes are dug in the usual manner and elevated into a simple dump truck following the digger. They may then be trucked to the barn and may be introduced into the separating equipment or stored as required.

A primary object of this invention is to provide an improved material separator.

Another object of this invention is to provide for the separation into three components of materials having different specific gravities.

Still another object of this invention is to provide for improved and more efficient separation of potatoes from foreign material.

Other and incidental objects of the invention will be apparent to those skilled in the art from a reading of the following specifications and an inspection of the accompanying drawing in which:

Figure 3 illustrates another form of this invention; and

Figure 4 illustrates still another form of this invention.

Figure 1:
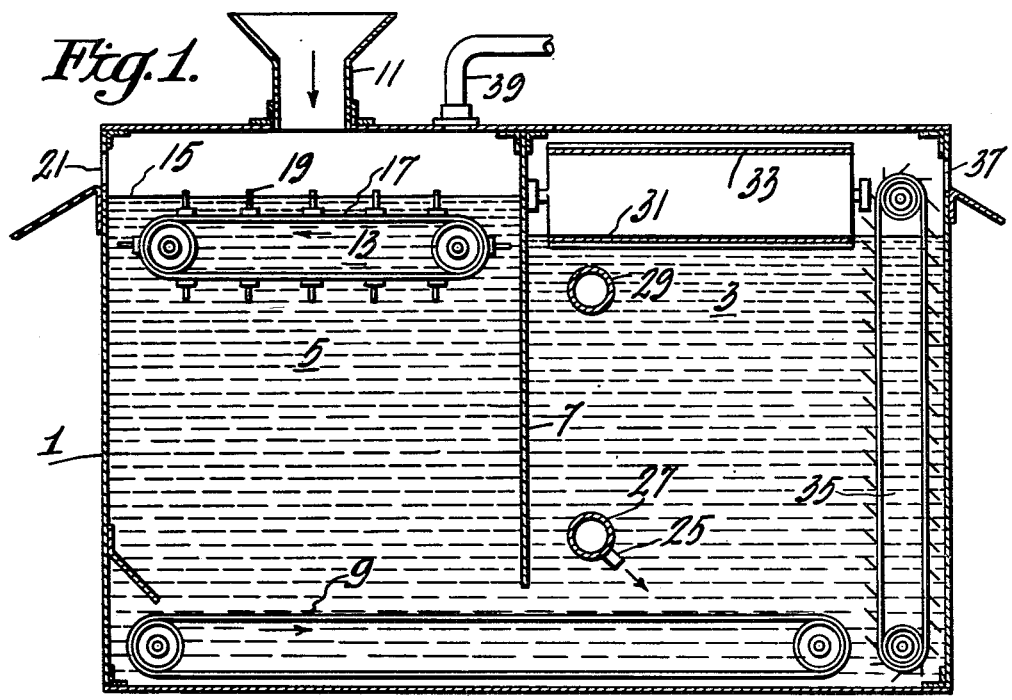
Figure 1 illustrates diagrammatically one form of this invention.
Figure 2:
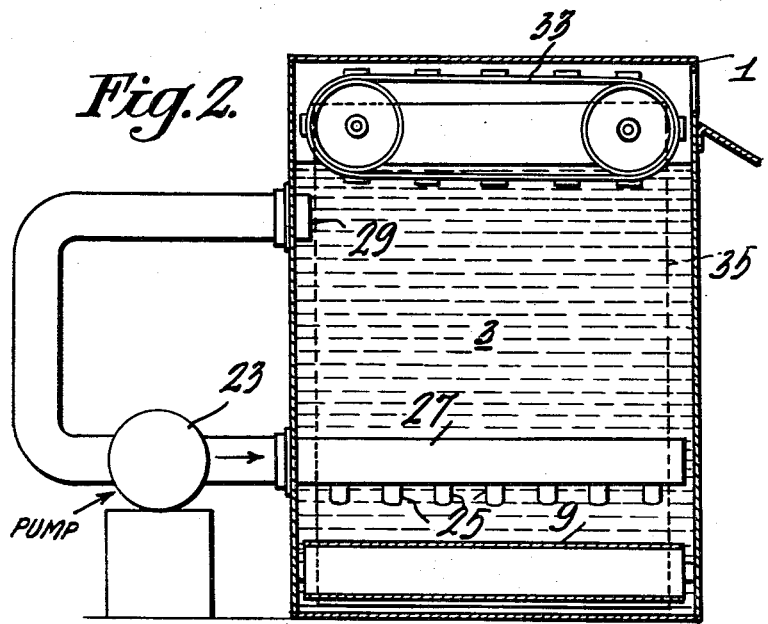
Figure 2 illustrates another view of the form of the invention shown in Figure 1.

Turning now in more detail to Figures 1 and 2, there is shown one form of this invention which involves a liquid container 1 having two sections 3 and 5 separated by a vertical member 7 extending from the top of the container 1 to a point near a conveyor 9.

The operation of the device may thus be understood by following through the different steps of operation.

For example, let there be inserted in hopper 11 of container 1 a mixture of materials having different specific gravities. A conveyor 13 moving in the direction shown by the arrow is positioned at the surface of the liquid 15 in section 5 of the container. Conveyor 13 consists essentially of a strap-like member 17 with associated paddle-like members 19. The strap-like members 17 and paddles 19 are so arranged that a material which has a greater specific gravity than that of the liquid in section 5 of the container will sink to the conveyor 9, while that portion of the material having a specific gravity less than the liquid in section 5 floats and is taken off through opening 21 in the container 1.

The material which sinks to conveyor 9 in section 1 is carried into section 3 of container 1 wherein the specific gravity of the liquid is increased by agitation. The increase in specific gravity in this form of the invention is performed by a liquid pump 23 which is more clearly shown in Figure 2 of the drawing, wherein like numerals refer to like elements.

The exit from pump 23 is discharged downward at an angle through orifices 25 of pipe 27. This pressure or disturbance of the liquid causes an increase in specific gravity of the liquid in section 3 by mixing small particles of the material in the water. These small particles may, for example, be mud, sand, etc.

The intake 29 of pump 23 is in the upper part of section 3. Under the influence of the increased specific gravity of the liquid in section 3 of the container 1, the material having a slightly greater specific gravity than the original liquid will rise upward to the surface of the liquid to be removed from the surface 31 of the liquid in section 3. The material will then be removed from surface 31 by conveyor 33.

The material on conveyor 9, which has a greater specific gravity than the liquids in both sections 5 and 3 of the container 1, will remain on the conveyor 9 to be picked up by still another conveyor 35 and carried out of the container 1 through opening 37.

It will be understood that the levels of the liquids in each section 5 and 3 will be different because of their different specific gravities. This is illustrated by the different levels 15 and 31 of the liquids.

It will also be understood that a certain amount of the liquids will be lost throughout operation through the openings 21 and 37 in the container 1. This loss will be replenished by inserting into section 1 fresh liquid through pipe 39. The supply of fresh liquid also tends to maintain at a proper amount the specific gravity of the liquid in section 5 of the container 1.

The employment of this invention for the separation of potatoes from foreign material can well be understood by proceeding through the cycle of separation.

The potatoes, dirt, stones, entangling roots, etc., are introduced into the top of section 5 through hopper 11. The agitation caused by the conveyor 17 under the surface of the liquid separates the tops and roots, which have a specific gravity less than that of water, so that they are removed by conveyor 17 at the top. The potatoes and other heavy material fall through the conveyor 17 and sink to the bottom. The fresh water added through liquid supply 39 maintains the specific gravity such that the potatoes will sink. Conveyor 9 then moves the potatoes, mud, sand, and stones through to the bottom of section 3 of the container. The dirt and sand are mixed with the water by pump 23 to produce a solution in section 3 which has an increased specific gravity sufficient to allow the potatoes to rise to the surface. The potatoes are then scraped off the surface 31 of the solution by a conveyor 33, which will then deliver them to washing and sorting equipment which is well known in the art. Still another conveyor 35 arranged as a sort of bucket lift receives the stones and other heavy material from the end of the belt conveyor, and raises them out of the liquid and delivers them through opening 37 of the tank.

Turning now in detail to Figure 3, there is shown another form of this invention wherein those elements which are similar to the elements of the form of the invention of Figure 1 take like numerals.

Like the arrangement shown in Figure 1, a container 1 has two sections 3 and 5. There is also a conveyor 13, a conveyor 9, a conveyor 35 and a conveyor 33.

In place of the pump 23 of the form of the invention shown in Figures 1 and 2, this form of the invention shown in Figure 3 has an air pump 41 for changing the specific gravity of the liquid by forcing air bubbles through the liquid in section 5 of the container 1. This is accomplished in perforated box-like member 43, which has a series of small holes 45 to bubble air through the liquid in section 5. In this form of the invention, the specific gravity of the liquid in section 3 is normal, while the specific gravity of the liquid in section 5 of the container 1 is slightly less than normal.

In this form of the invention, it will be seen that conveyor 33 will remove from the solution that part of the material having a specific gravity which is only slightly less than that of the liquid in its normal state.

Thus, for example, in the form of the invention shown in Figure 3 a material having a specific gravity slightly less than the liquid such as water may be separated from a mixture of materials having specific gravities greater than that of the liquid and a great deal less than the liquid.

There is shown in Figure 4 still another form of this invention which involves both the liquid pump 23 and the air pump 41.

The form of the invention shown in Figure 4 illustrates an arrangement employing two mediums for changing the specific gravity of the liquid, while the air pump 41 and its associated air chamber 43 may decrease the specific gravity of the liquid. The increase and decrease of specific gravity will, of course, take place in the sequential form of operation of this invention sequentially with the use of normal specific gravity of the liquid.

In the form of the invention shown in Figure 4, single separation may also be had by employing only one form of arrangement for changing the specific gravity, such as, for example, that separation which may be accomplished by inserting the mixture of materials into a solution having a normal specific gravity, removing that portion which floats, then increasing the specific gravity with liquid pump 23, and then separately removing the portion which floats in the increased specific gravity.

The form of the invention shown in Figure 4 may also be employed in the following manner. A mixture of materials may be inserted in the hopper 11 under conditions of decreased specific gravity caused by operation of air pump 41. The air pump 41 may then be shut off, allowing a return to normal of the specific gravity of the solution. The portion of the material which floats in the normal specific gravity may then be separately removed.

Having thus described the invention, what is claimed is:

1. A method for the separation of materials in accordance with specific gravity from a mixture of materials having different specific gravities comprising the steps of inserting said mixture of materials into a liquid, decreasing the specific gravity of the liquid by maintaining a quantity of air bubbles throughout said liquid to form a foam-like mixture of air and said liquid, separately removing that portion of the material which floats in the liquid before and after decreasing the specific gravity of the liquid, and separately removing that portion of the material which sinks in the liquid at its greatest specific gravity.

2. A method of sorting out materials in accordance with their specific gravity comprising the steps of changing the specific gravity of a liquid from its normal specific gravity by injecting air bubbles into the liquid to maintain a mixture of air bubbles and liquid, inserting said mixture of materials into said liquid, removing that portion of the material which floats in the liquid at its changed specfic gravity, changing the specific gravity of said liquid back to its normal specific gravity by stopping the injection of air bubbles into the liquid, removing that portion of the material which floats in the liquid at its normal specific gravity, and separately removing that portion of the material which sinks in the liquid at its greatest specific gravity.

3. A method of sorting out materials in accordance with their specific gravity from a mixture of materials having different specific gravities comprising the steps of changing the specific gravity of a liquid by blowing air into the liquid to develop a mixture of air and water, inserting said mixture of materials into said liquid, removing that portion of the material which floats in the liquid at its changed specific gravity as a result of the specific gravity of that portion of the material with respect to the specific gravity of the mixture of air and liquid, changing the specific gravity of said liquid back to its normal specific gravity, separately removing that portion of the material which sinks in the liquid at its greatest specific gravity and separately removing that portion of the material which floats in the liquid at its greatest specific gravity.

4. An arrangement for separating materials of different specific gravities comprising in combination a sectionalized liquid container having a first and second section, an air pump means operatively connected to the bottom of said first section for adding air bubbles to the liquid for decreasing the specific gravity of the liquid in said first section, a first material conveyor positioned in the bottom of said sectionalized liquid container for transferring material from the first to the second of said sections, and an additional material conveyor positioned at the liquid level of each of said sections.

5. A material separator comprising in combination a liquid container, said liquid container having a first section and a second section positioned side by side, said sections being separated by a container sectionalizing member extending upward from a point near the bottom of said container, a material conveyor positioned in the bottom of said container and extending across the bottom of both sections of said container and under said container sectionalizing member, said material conveyor arranged to convey material from the first section to the second section of said container, an air chamber located at the bottom of said first section, an air pump operatively connected to said air chamber, a plurality of holes connecting said air chamber with the bottom of the first section of said container, a second material conveyor positioned in the top of the first section of said container at liquid level and a third material conveyor positioned in the top of the second section of said container at liquid level.

References Cited in the file of this patent

UNITED STATES PATENTS

| | | |
|---|---|---|
| 771,874 | Grant | Oct. 11, 1904 |
| 1,195,264 | Pennington | Aug. 22, 1916 |
| 2,293,340 | Hirst | Aug. 18, 1942 |
| 2,426,398 | Lathrop | Aug. 26, 1947 |

FOREIGN PATENTS

| | | |
|---|---|---|
| 411,985 | Great Britain | June 21, 1934 |

OTHER REFERENCES

Oil and Soap, April 1946, pages 125, 126. (Copy in Div. 63.)

Fiat Final Report 869, dated July 22, 1946, pages 1 and 5.